(12) United States Patent
Matsuda

(10) Patent No.: US 11,825,058 B2
(45) Date of Patent: Nov. 21, 2023

(54) COMMUNICATION DEVICE AND NON-TRANSITORY COMPUTER-READABLE MEDIUM STORING COMPUTER-READABLE INSTRUCTIONS FOR COMMUNICATION DEVICE

(71) Applicant: BROTHER KOGYO KABUSHIKI KAISHA, Nagoya (JP)

(72) Inventor: Munehisa Matsuda, Nagoya (JP)

(73) Assignee: Brother Koygo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/810,030

(22) Filed: Jun. 30, 2022

(65) Prior Publication Data
US 2023/0007944 A1 Jan. 12, 2023

(30) Foreign Application Priority Data

Jul. 6, 2021 (JP) ................................. 2021-112220

(51) Int. Cl.
*H04N 1/44* (2006.01)
*H04L 9/40* (2022.01)

(52) U.S. Cl.
CPC ......... *H04N 1/4413* (2013.01); *H04L 63/083* (2013.01); *H04N 2201/0094* (2013.01)

(58) Field of Classification Search
CPC .......... G06F 21/45; G06F 21/32; G06F 21/31; G06F 2221/2131; G06F 3/0488; G06F 21/6245; G06F 21/46; G06F 21/6218; G06F 21/10; G06F 3/04886; G06F 21/30; G06F 21/35; G06F 3/0482; G06F 21/33; G06F 21/62; G06F 2221/2117; G06F 2221/2141; G06F 15/00; G06F 21/608; G06F 3/04883; G06F 3/1222; G06F 3/1238; G06F 3/1285; G06F 21/36; G06F 21/44; G06F 21/445; G06F 2221/2101; G06F 3/016; G06F 16/24; G06F 21/00; G06F 21/575; G06F 21/602; G06F 21/79; G06F 21/84; G06F 3/03547;
(Continued)

(56) References Cited

U.S. PATENT DOCUMENTS 6,795,703 B2 * 9/2004 Takae .................... H04W 8/265
  455/418
7,095,830 B1 * 8/2006 Hamaguchi .......... H04N 1/4413
  379/100.09
(Continued)

FOREIGN PATENT DOCUMENTS

JP 2019016834 A 1/2019

*Primary Examiner* — Negussie Worku
(74) *Attorney, Agent, or Firm* — Scully, Scott, Murphy & Presser, PC

(57) ABSTRACT

A communication device, in a case where a changing request is inputted by a specific user under a situation where a memory stores a first password used by a plurality of users, send first information to each of a plurality of destinations, the changing request being for changing the first password to another password; and in a case where the first information is used in a first destination among the plurality of destinations and an instruction for changing the first password to the another password according to the changing request is provided by a first user after the first information has been sent to each of the plurality of destinations, store a second password in the memory instead of the first password.

12 Claims, 6 Drawing Sheets

(58) Field of Classification Search
CPC ........ G06F 3/044; G06F 3/048; G06F 3/0481;
G06F 8/654; G06F 9/4416; G06F 1/12;
G06F 1/14; G06F 1/163; G06F 1/1694;
G06F 1/3228; G06F 1/3265; G06F
11/1438; G06F 11/1482; G06F 11/2023;
G06F 11/2038; G06F 11/2046; G06F
16/9035; G06F 16/951; G06F 18/00;
G06F 21/316; G06F 21/41; G06F 21/604;
G06F 21/606; G06F 21/77; G06F
2200/1637; G06F 2203/04102; G06F
2203/04803; G06F 3/017; G06F 3/0484;
G06F 3/04845; G06F 3/1423; G06F
3/1454; G06F 9/451; H04N 2201/0094;
H04N 1/4413; H04N 1/00209; H04N
1/00244; H04N 1/0097; H04N 1/4426;
H04N 1/00204; H04N 23/611; H04N
23/63; H04N 23/632; H04N 7/15
USPC ....................................................... 358/1.15
See application file for complete search history.

(56) References Cited

U.S. PATENT DOCUMENTS

| | | | |
|---|---|---|---|
| 7,814,156 B2* | 10/2010 | Sasaki | G06Q 10/10 709/228 |
| 2002/0016823 A1* | 2/2002 | Ueno | H04L 51/063 709/206 |
| 2014/0051396 A1* | 2/2014 | Kim | H04L 63/083 455/26.1 |
| 2015/0229788 A1* | 8/2015 | Shimizu | H04N 1/00464 358/1.13 |
| 2016/0124692 A1* | 5/2016 | Nakatsu | G06F 3/1273 358/1.15 |
| 2016/0316093 A1* | 10/2016 | Tamura | H04N 1/00411 |
| 2019/0004752 A1 | 1/2019 | Yamada | |
| 2019/0050170 A1* | 2/2019 | Ren | G06F 3/1288 |
| 2019/0327373 A1* | 10/2019 | Yu | H04N 1/00501 |
| 2020/0128149 A1* | 4/2020 | Sasaki | H04N 1/00209 |
| 2021/0092254 A1* | 3/2021 | Itaya | G06F 16/3337 |
| 2023/0008310 A1* | 1/2023 | Arai | H04L 63/083 |

* cited by examiner

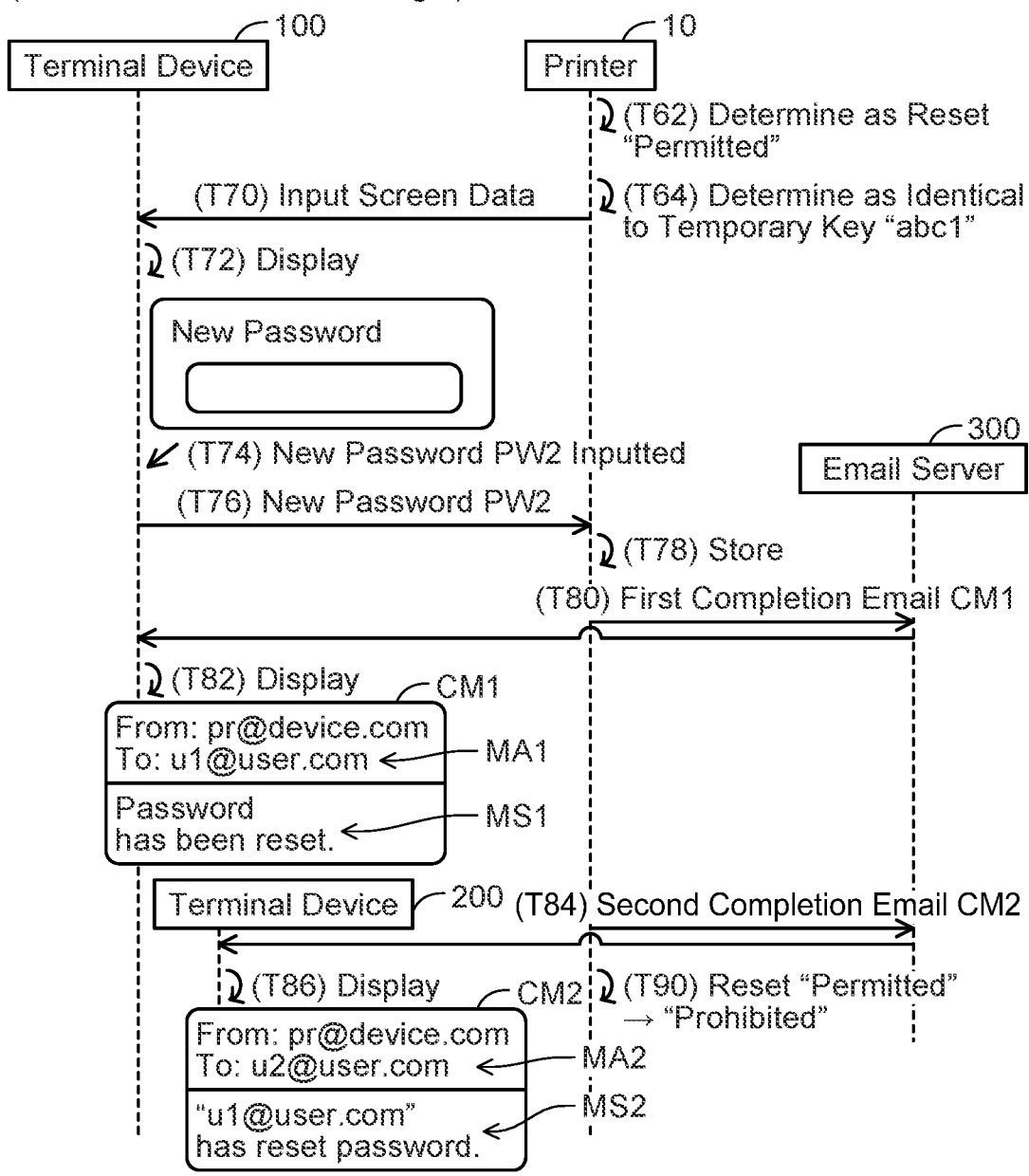

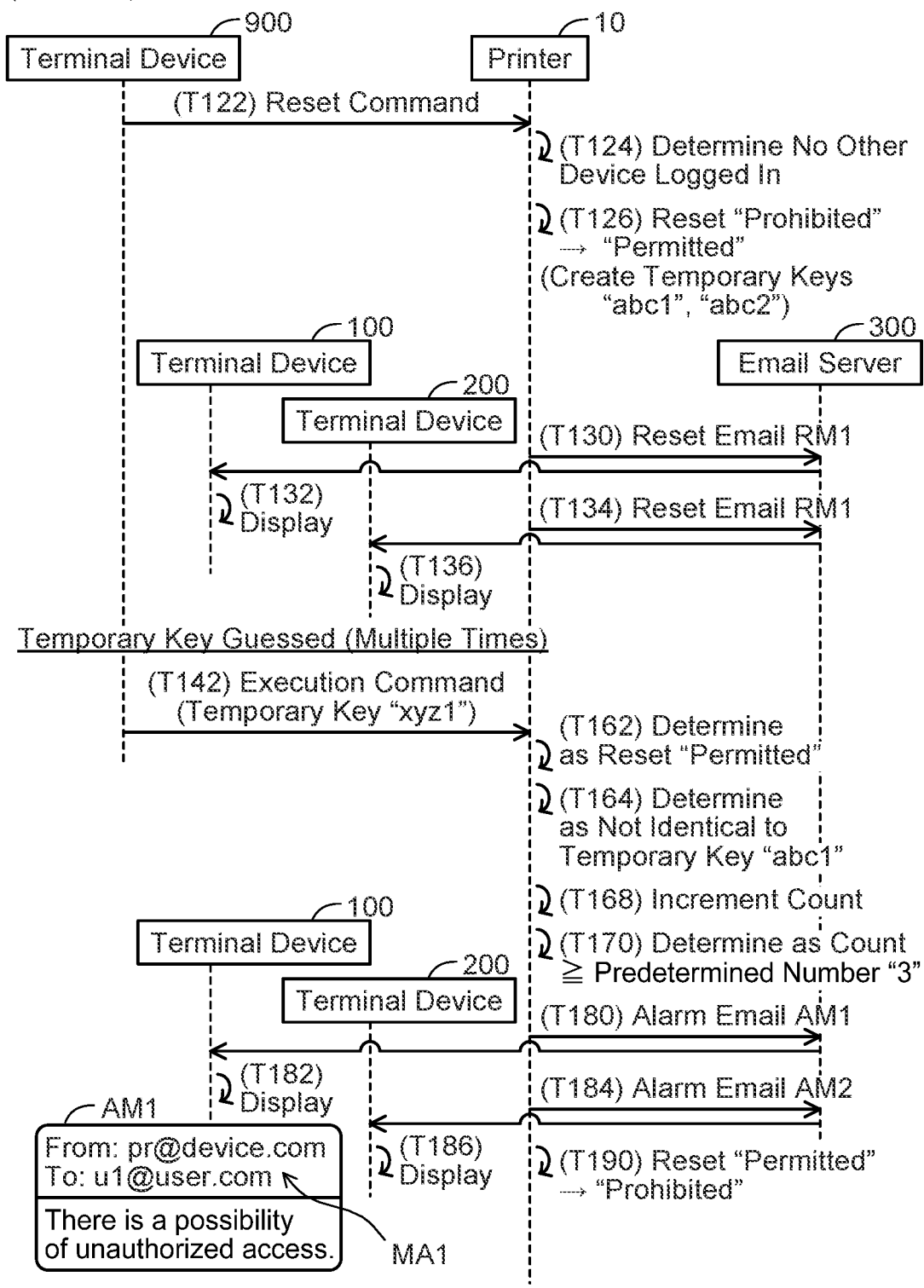

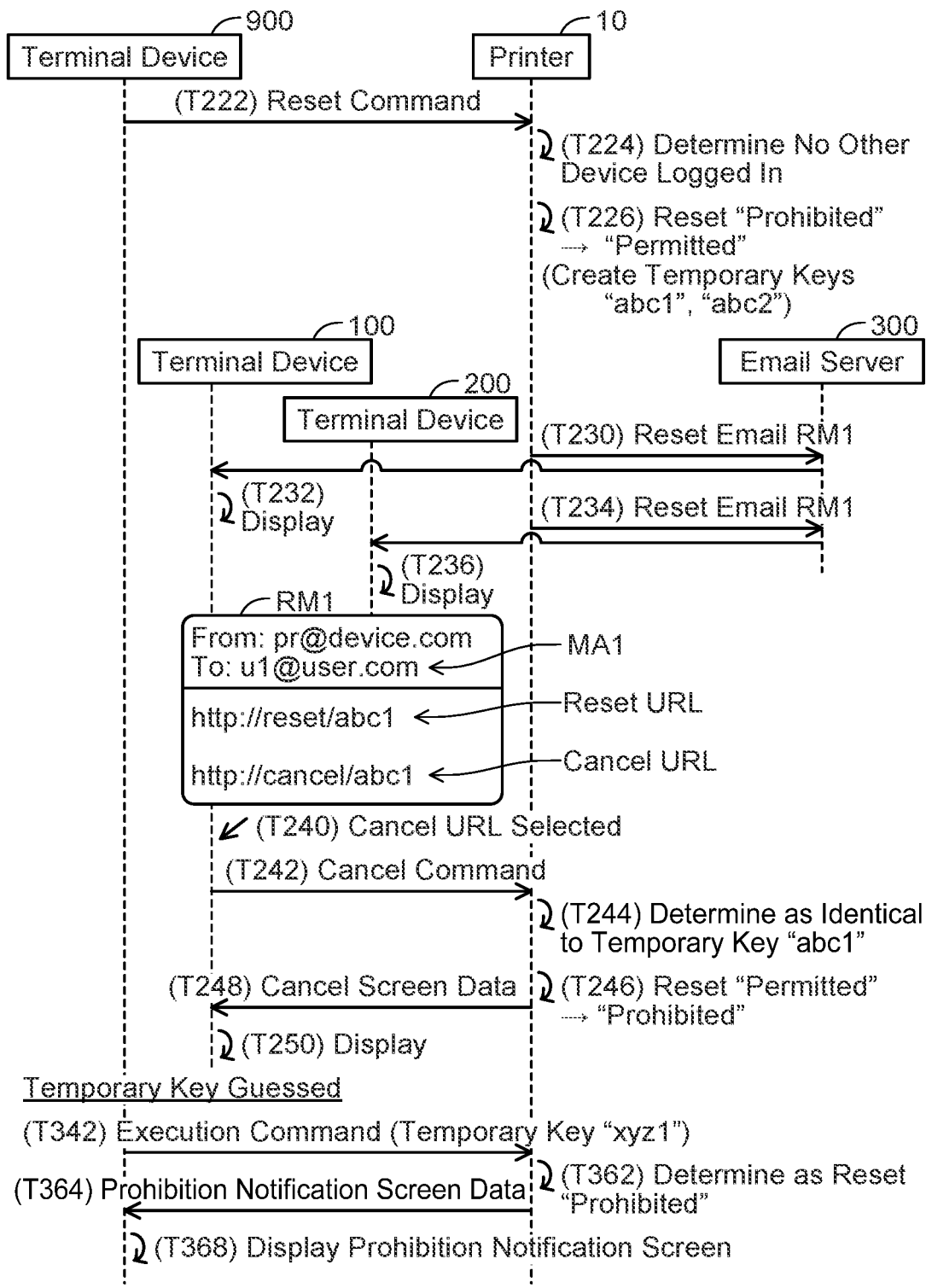

COMMUNICATION DEVICE AND NON-TRANSITORY COMPUTER-READABLE MEDIUM STORING COMPUTER-READABLE INSTRUCTIONS FOR COMMUNICATION DEVICE

REFERENCE TO RELATED APPLICATION

This application claims priority to Japanese Patent Application No. 2021-112220 filed on Jul. 6, 2021, the contents of which are hereby incorporated by reference into the present application.

BACKGROUND ART

An MFP that stores, for each of a plurality of users, a passcode used by the user is known. When a specific user among the plurality of users is selected, the MFP recreates the passcode stored in association with the specific user.

DESCRIPTION

The above technique contemplates only the situation in which one user uses one passcode. The present disclosure provides a technique for suitably changing from a first password to a second password under the situation in which a plurality of users uses the first password.

A communication device disclosed herein may comprise a controller. The controller may be configured to: in a case where a changing request is inputted by a specific user under a situation where a memory stores a first password used by a plurality of users in association with a plurality of pieces of destination information corresponding to the plurality of users, send first information to each of a plurality of destinations indicated by the plurality of pieces of destination information in the memory, the changing request being for changing the first password to another password, the first information being for receiving an instruction for changing the first password to another password according to the changing request; and in a case where the first information is used in a first destination among the plurality of destinations and an instruction for changing the first password to the another password according to the changing request is provided by a first user among the plurality of users after the first information has been sent to each of the plurality of destinations, store a second password being the another password in the memory instead of the first password.

According to such a configuration, the communication device sends the first information to each of the plurality of destinations corresponding to the plurality of users who uses the first password in the case where the changing request is inputted by the specific user under the situation where the memory stores the first password. Consequently, the instruction for changing the first password to another password according to the changing request is provided by the first user among the plurality of users who uses the first password, by which the second password is stored in the memory instead of the first password. Under the situation where the plurality of users uses the first password, the changing of the first password to the second password can suitably be executed.

A control method for implementing the above communication device, a computer program for the above communication device, and a non-transitory computer-readable recording medium storing the computer program are also novel and useful.

FIG. 4 illustrates a case C1 in which resetting of a password succeeds.

FIG. 5 illustrates a case C2 in which a reset command is received from a terminal device of a third party.

FIG. 6 illustrates a case C3 in which the reset command is received from the terminal device of the third party.

CONFIGURATION OF COMMUNICATION SYSTEM 2; FIG. 1

Figure 1:
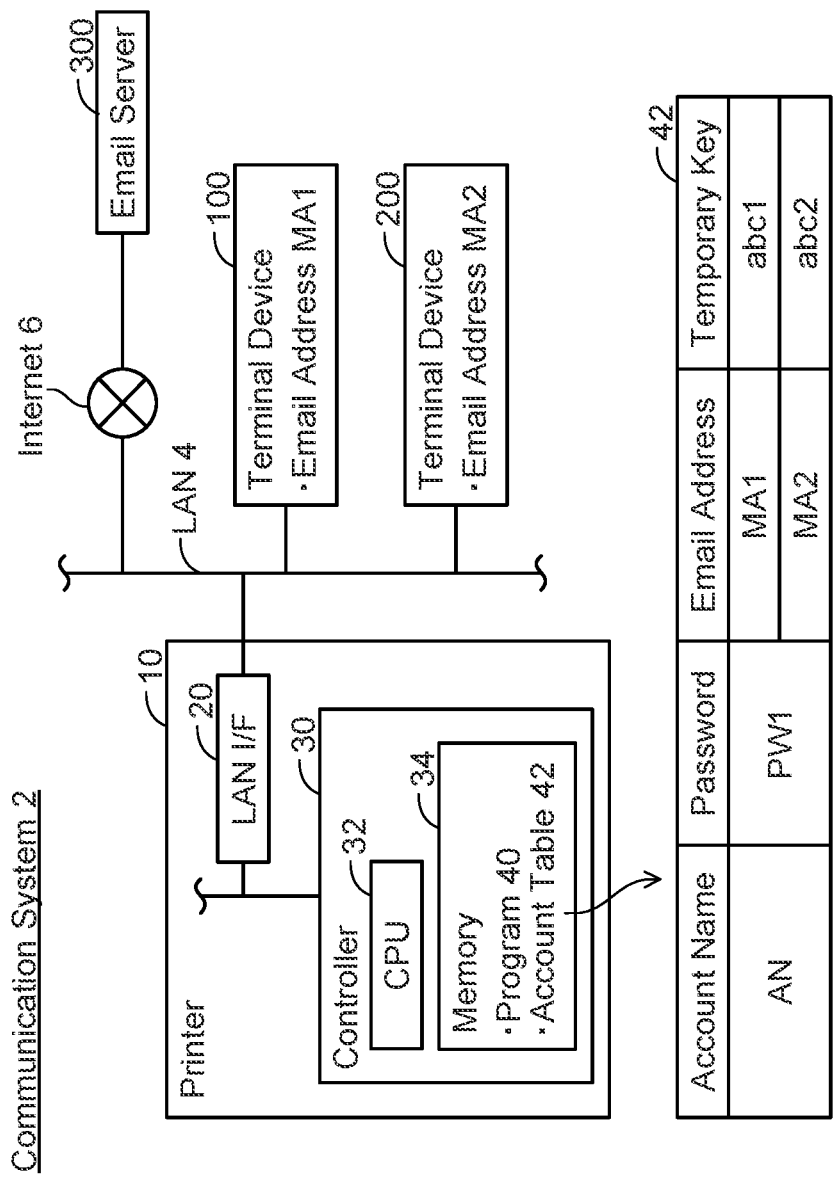
FIG. 1 illustrates a configuration of a communication system.

As illustrated in FIG. 1, a communication system 2 includes a printer 10, terminal devices 100, 200 and an email server 300. The printer 10 and the terminal devices 100, 200 belong to the same Local Area Network (LAN) 4, and are configured to communicate with each other via the LAN 4. The LAN 4 may be a wired LAN or a wireless LAN.

The LAN 4 is connected to the Internet 6. The email server 300 is connected to the Internet 6. The email server 300 is a server for sending and receiving emails. Devices on the LAN 4 (e.g., the printer 10) are configured to communicate with the email server 300 via the Internet 6.

The terminal devices 100, 200 may be desktop PCs, smartphones, tablet PCs, notebook PCs, and the like. The terminal device 100 is used by a first user and stores an email address MA1 used by the first user. The terminal device 200 is used by a second user and stores an email address MA2 used by the second user. In a variant, the terminal devices 100, 200 may not store the email addresses MA1, MA2, and the terminal devices 100, 200 only need to be able to view emails of which recipients are the email addresses MA1, MA2.

Configuration of Printer 10

The printer 10 is a peripheral device (i.e., a peripheral device of the terminal devices 100, 200) configured to execute a printing process. The printer 10 is further configured to execute a webserver function. The webserver function is a function to send webpage data corresponding to a webpage to a terminal device (e.g., the terminal device 100) in response to the terminal device accessing a webserver in the printer 10. The webpage is, for example, a page to manage settings of the printer 10. The printer 10 may be a multi-function peripheral configured to execute a scan process, a faxing process and the like in addition to the printing process and the webserver function. The printer 10 includes a LAN interface (hereafter an interface is referred to as "I/F") 20 and a controller 30. The LAN I/F 20 is an I/F for executing communication via the LAN 4 and connected to the LAN 4.

The controller 30 includes a CPU 32 and a memory 34. The CPU 32 executes various processes according to a program 40 stored in the memory 34. The memory 34 is configured of a volatile memory, a nonvolatile memory, and the like. The memory 34 further stores an account table 42.

The account table 42 is a table which stores account information, a plurality of email addresses and a plurality of temporary keys in association with each other. The account information is information to log into the webserver function of the printer 10. The account information includes an account name AN and a password PW1. The account information is used by a plurality of users. The web server function can be used by the plurality of users who knows the account information. In a variant, the account information may not include an account name and may include only a password. In another variant, the account information may include a plurality of account names.

Each of the plurality of email addresses in the account table 42 corresponds to one of the plurality of users who uses the account information. In the present embodiment, the account table 42 stores an email address MA1 corresponding to a first user and an email address MA2 corresponding to a second user. The email addresses MA1, MA2 are examples. For example, the account table 42 may store three or more email addresses.

Each of the temporary keys is a key (i.e., character strings) which has a predetermined expiration time. The predetermined expiration time is for example one hour. A temporary key "abc1" in the figure is merely an example. Generally, a temporary key is randomly created and has a character string which is difficult for a third party to guess (e.g., long character string consisting of ten characters).

In the account table 42, for each of the plurality of email addresses, one temporary key is stored in association therewith. Creation of each temporary key is triggered by receipt of a reset command to be described (see T22 of FIG. 2), and the temporary key is stored in the account table 42. When the predetermined expiration time passes since when the temporary key was stored in the account table 42, the temporary key is deleted from the account table 42. In a variant, the printer 10 may store a list of temporary keys in advance. Then, triggered by the receipt of the reset command to be described, the printer 10 may select, from the list, the same number of temporary keys as the plurality of email addresses in the account table 42 and store the temporary keys in the account table 42.

Figure 2:
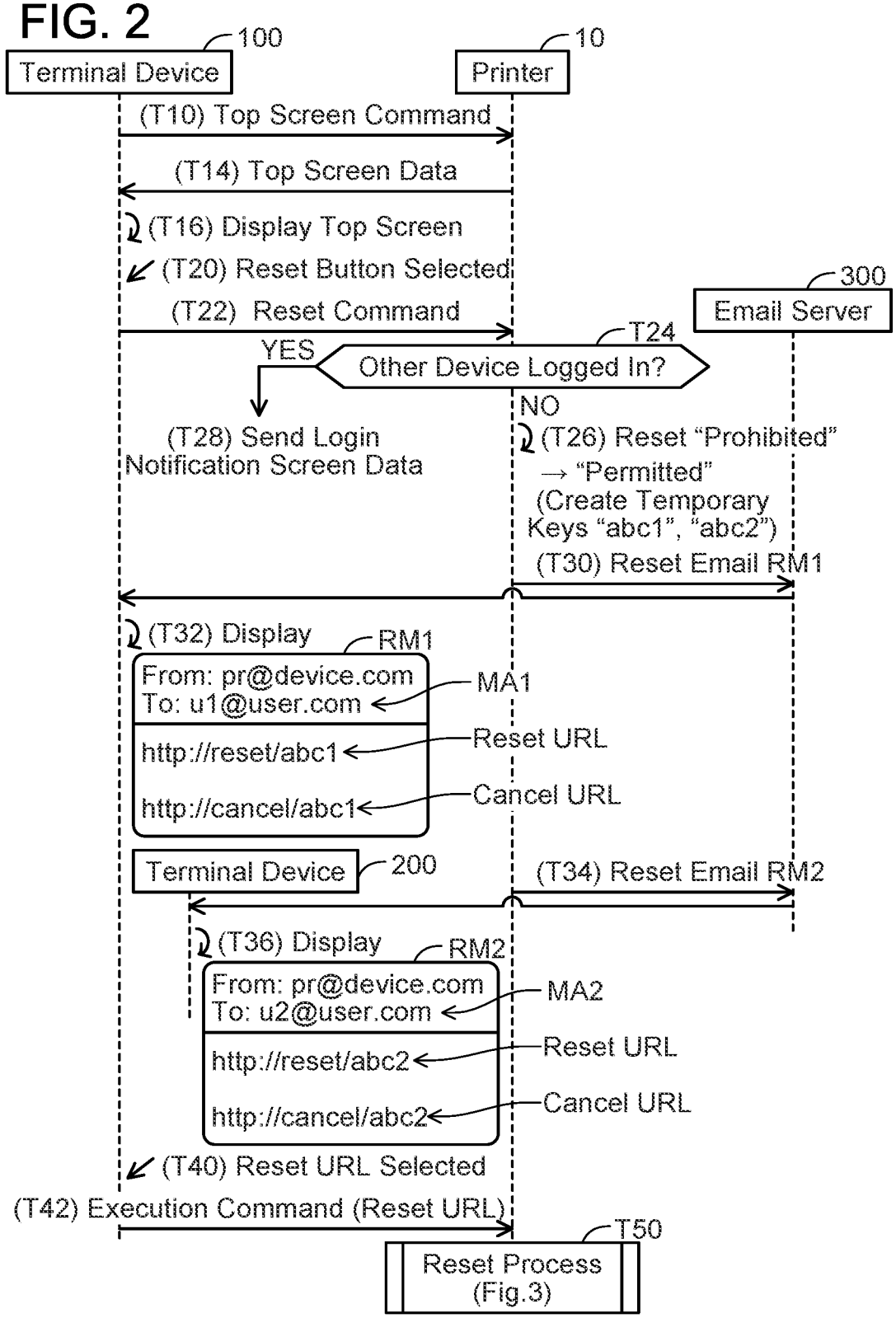
FIG. 2 illustrates a sequence diagram of a process for resetting a password.

Process for Resetting Password; FIG. 2

Referring to FIG. 2, a process for resetting a password in the account table 42 of the printer 10 will be described. In the following descriptions, unless noted otherwise, for easier understanding, a process executed by the CPU 32 of the printer 10 will be described with the printer 10 as a subject of the process instead of describing the CPU 32 as the subject of the process. Further, in the following descriptions, the printer 10 and the terminal devices 100, 200 communicate with each other via the LAN 4 and the LAN I/F 20. Hereafter, unless noted otherwise, the explanations "via the LAN 4" and "via the LAN I/F 20" may be omitted.

When a predetermined request is inputted to the terminal device 100 from the first user (e.g., when an IP address of the printer 10 is inputted), the terminal device 100 sends, to the printer 10, a top screen command which requests top screen data in T10. The top screen data is webpage data corresponding to a top screen for logging into the server function of the printer 10. For example, the top screen command is a Hyper Text Transfer Protocol (HTTP) command. The top screen includes an input box for the account information and a reset button for receiving a request for resetting a password from a user.

When the printer 10 receives the top screen command from the terminal device 100 in T10, the printer 10 sends the top screen data to the terminal device 100 in T14.

When the terminal device 100 receives the top screen data from the printer 10 in T14, the terminal device 100 displays the top screen corresponding to the top screen data in T16. In the present case, the first user of the terminal device 100 wishes not to log into the server function but to reset the password. For example, the first user selects the reset button when he/she forgot the password.

In T20, the first user of the terminal device 100 selects the reset button in the top screen. Consequently, in T22, the terminal device 100 sends, to the printer 10, a reset command which requests sending of an email including a reset Uniform Resource Locator (URL) and a cancel URL. The reset URL is a URL including information (e.g., a pass) indicating where a program for a reset process to be described (see T50) is stored and a temporary key to be described. The cancel URL is a URL including information indicating where a program of a process to cancel changing of the password in the account table 42 to another password is stored and the temporary key to be described. In the present embodiment, the reset button is included in the top screen displayed on the terminal device 100 before logging into the server function. In a variant, the reset button may be included in a screen displayed on the terminal device 100 after logging into the server function.

When the printer 10 receives the reset command from the terminal device 100 in T22, the printer 10 determines in T24 whether a login session in which the account information is used is established with an external device (e.g., the terminal device 200). When the printer 10 determines that the login session is established with the external device (YES in T24), the printer 10 proceeds to T28.

In T28, the printer 10 sends login notification screen data to the terminal device 100 which is a sender of the reset command. The login notification screen data is webpage data corresponding to a login notification screen which notifies that the login session is currently established. By viewing the login notification screen, the first user of the terminal device 100 can see that the login session is currently established and the password cannot be reset.

When the printer 10 determines that the login session is not established with the external device (NO in T24), the printer 10 changes a state of the account table 42 from a prohibited state to a permitted state in T26.

The prohibited state is a state in which execution of the process for resetting the password is prohibited. Specifically, the prohibited state is a state in which no temporary key is stored in the account table 42. In a variant, the prohibited state may be a state in which a predetermined flag is set to a value indicating "prohibited" under the state in which temporary key(s) is (are) stored in the account table 42.

The permitted state is a state in which execution of the process for resetting the password is permitted. Specifically, the permitted state is a state in which the temporary key(s) is (are) stored in the account table 42. In the present embodiment, at this point, two email addresses MA1, MA2 are stored in the account table 42. The printer 10 creates two temporary keys "abc1", "abc2" in T24. Then, the printer 10 stores the temporary key "abc1" in association with the email address MA1 in the account table 42 and stores the temporary key "abc2" in association with the email address MA2 in the account table 42 (see 42 in FIG. 1). Consequently, the state of the printer 10 is changed from the prohibited state to the permitted state. In a variant, the permitted state may be a state in which a predetermined flag is set to a value indicating "permitted" under the state in which the temporary key(s) is (are) stored in the account table 42. In another variant, the printer 10 may randomly create a reset URL and store the reset URL in the account table 42. In this variant, the permitted state may be a state in which the reset URL is stored in the account table 42 and the prohibited state may be a state in which the reset URL is not stored in the account table 42.

In the subsequent T30, T34, the printer 10 sends reset email s RM1, RM2 to the email server 300. The reset email RM1 is an email of which recipient is the email address MA1 in the account table 42, and includes the reset URL including the temporary key "abc1" stored in association with the email address MA1 and the cancel URL including the temporary key "abc1". On the other hand, the reset email RM2 is an email of which recipient is the email address MA2 in the account table 42, and includes the reset URL including the temporary key "abc2" stored in association with the email address MA2 and the cancel URL including the temporary key "abc2". In a variant, the printer 10 may send an instruction for sending of the reset emails RM1, RM2 to a mediation server. Consequently, the mediation server may send the reset emails RM1, RM2 to the email server 300.

When the email server 300 receives the reset email RM1 from the printer 10 in T30, the email server 300 sends the reset email RM1 to the terminal device 100 corresponding to the email address MA1. When the terminal device 100 receives the reset email RM1 from the email server 300 in T30, the terminal device 100 displays the received reset email RM1 in T32.

The email server 300 sends the reset email RM2 to the terminal device 200 corresponding to the email address MA2 in T34. The terminal device 200 displays the reset email RM2 in T36.

In the present case, the first user of the terminal device 100 selects the reset URL in the reset email RM1 in T40. Consequently, in T42, the terminal device 100 sends, to the printer 10, an execution command for causing the printer 10 to execute a reset process to be described (see T50). The execution command includes the reset URL in the reset email RM1 selected in T40.

When the printer 10 receives the execution command from the terminal device 100 in T42, the printer 10 executes the reset process in T50. Details of the reset process will be described in FIG. 3.

Figure 3:
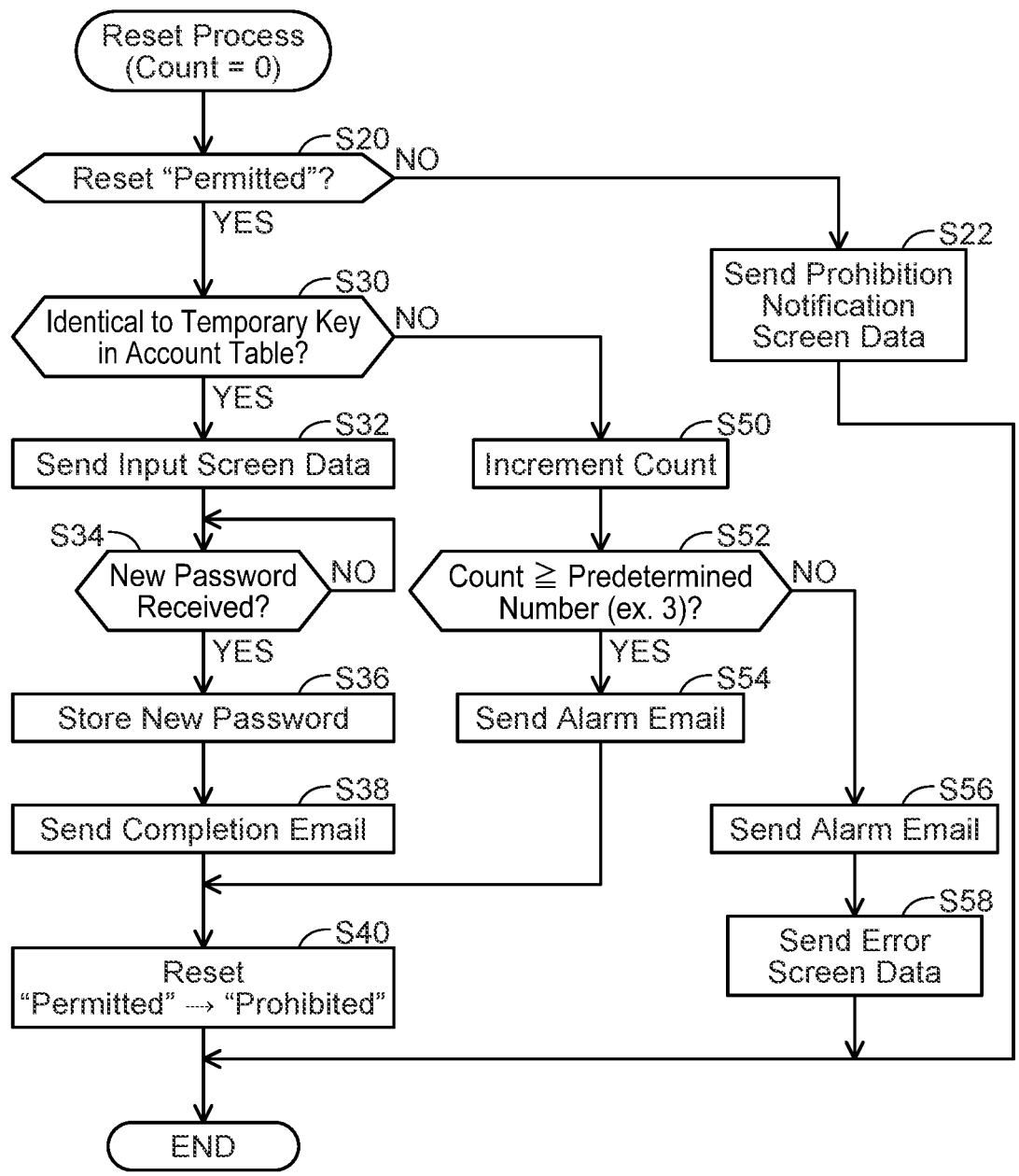
FIG. 3 illustrates a flowchart of a reset process.

Reset Process; FIG. 3

Referring to FIG. 3, the reset process will be described. The printer 10 sets a predetermined count to "0" at a timing of creation of the temporary keys in T26 of FIG. 2.

In S20, the CPU 32 determines whether the state of the printer 10 is the reset-permitted state. When the CPU 32 determines that the state of the printer 10 is the reset-prohibited state (NO in S20), the CPU 32 proceeds to S22. For example, when the execution command is received after the expiration time of the temporary key has passed, it is determined that the state of the printer 10 is the prohibited state due to passing of the expiration time.

In S22, the CPU 32 sends prohibition notification screen data to the terminal device which is a sender of the execution command (see T42 of FIG. 2, hereafter referred to as "communication-target terminal"). The prohibition notification screen data is webpage data corresponding to a prohibition notification screen which notifies that the reset of the password is prohibited. Consequently, the user of the communication-target terminal can see that the reset of the password is prohibited by viewing the prohibition notification screen. In the aforementioned variant in which the prohibited state is the state in which the reset URL is not stored in the account table 42, for example, the prohibition notification screen may be a screen which shows that a webpage indicated that the reset URL included in the execution command does not exist (e.g., 404 Not Found). When S22 ends, the process of FIG. 3 ends.

When the CPU32 determines that the state of the printer 10 is the permitted state (YES in S20), the CPU 32 proceeds to S30. In S30, the CPU 32 determines whether the temporary key in the execution command is identical to any of the plurality of temporary keys in the account table 42. When the CPU 32 determines that the temporary key in the execution command is identical to any of the plurality of temporary keys in the account table 42 (YES in S30), the CPU 32 proceeds to S32.

In S32, the CPU 32 sends input screen data to the communication-target terminal. The input screen data is webpage data corresponding to an input screen to input a new password.

In the subsequent S34, the CPU 32 monitors receipt of the new password from the communication-target terminal. When the CPU 32 receives the new password from the communication-target terminal (YES in S34), the CPU 32 proceeds to S36.

In S36, instead of the password currently stored in the account table 42, the CPU 32 stores the new password received in S34 in the account table 42. In other words, the CPU 32 resets (i.e., changes) the password in the account table 42 to the password received from the communication-target terminal.

In the subsequent S38, the CPU 32 sends, to the email server 300, two types of completion emails which indicate that the reset of the password has been completed. The two types of completion emails include a first completion email and a second completion email. The first completion email includes, as its recipient, the email address (hereafter referred to as "target email address") stored in association with the temporary key included in the execution command received from the communication-target terminal. On the other hand, the second completion email includes, as its recipient, email address(es) other than the target email address among the plurality of email addresses in the account table 42. The second completion email includes a message different from the first completion email (see MS2 of FIG. 4). The CPU 32 sends the second completion email to the email server 300, directed to all the email address(es) other than the target email address among the plurality of email addresses in the account table 42.

In the subsequent S40, the CPU 32 changes the state of the printer 10 from the permitted state to the prohibited state. Specifically, the CPU 32 deletes all the temporary keys in the account table 42. With such a configuration, the password can be prevented from being reset again due to another user (e.g., the second user) using the reset URL after the password has been reset by the user (e.g., the first user) of the communication-target terminal. When S40 ends, the process of FIG. 3 ends.

When the CPU 32 determines that the temporary key in the execution command is not identical to any of the plurality of temporary keys in the account table 42 (NO in S30), the CPU 32 proceeds to S50. In S50, the CPU 32 increments the count.

In S52, the CPU 32 determines whether the current count is greater than or equal to a predetermined value (e.g., "3"). When the CPU 32 determines that the current count is greater than or equal to the predetermined value (YES in S52), the CPU 32 proceeds to S54.

In S54, the CPU 32 sends, to the email server 300, an alarm email which includes each of the email addresses in the account table 42 as the recipient. The alarm email includes a message which alarms the users about the use of a wrong temporary key. When S54 ends, the CPU 32 proceeds to S40.

When the CPU 32 determines that the current count is smaller than the predetermined value (NO in S52), the CPU 32 proceeds to S56. S56 is the same as S54. In the subsequent S58, the CPU 32 sends error screen data to the communication-target device. The error screen data is webpage data corresponding to an error screen which notifies that the temporary key is wrong. The user of the communication-target terminal can see that the temporary key is wrong by viewing the error screen. When S56 ends, the process of FIG. 3 ends.

Case C1; FIG. 4

Referring to FIG. 4, Case C1 in which reset of the password succeeds will be described. Case C1 of FIG. 4 is a continuation of FIG. 2.

In T62, the printer 10 determines that the state of the printer 10 is the reset-permitted state (YES in S20 of FIG. 3). In T64, the printer 10 determines that the temporary key "abc1" in the execution command of T42 of FIG. 2 is identical to the temporary key "abc1" in the account table 42 (YES in S30). In T70, the printer 10 sends the input screen data to the terminal device 100 (i.e., the communication-target terminal) (S32).

When the terminal device 100 receives the input screen data from the printer 10 in T70, the terminal device 100 displays the input screen in T72. In the present case, the first user of the terminal device 100 inputs a new password PW2 to the input screen in T74. In T76, the terminal device 100 sends the password PW2 inputted in T74 to the printer 10.

When the printer 10 receives the password PW2 from the terminal device 100 in T74 (YES in S34 of FIG. 2), the printer 10 stores the password PW2 in the account table 42 instead of the password PW1 in T78 (S36).

In T80, the printer 10 sends, to the email server 300, a first completion email CM1 including as its recipient the email address MA1 stored in association with the temporary key "abc1" included in the execution command received from the terminal device 100 (S38 of FIG. 2). Consequently, the terminal device 100 displays the first completion email CM1 in T82. The first completion email CM1 includes a message MS1 which indicates that reset of the password has been completed by the first user of the terminal device 100 having used the reset URL. Consequently, the first user can see that the reset of the password has been completed in response to selection of the reset URL in T40 of FIG. 2.

In T84, the printer 10 sends, to the email server 300, a second completion email CM2 including as its recipient the email address MA2 which is other than the email address MA1 being the target email address (S38). Consequently, the terminal device 200 displays the second completion email CM2 in T86. The second completion email CM2 includes a message MS2 which indicates that reset of the password has been completed by the reset URL having been used by the first user corresponding to the email address MA1, which is the recipient of the reset URL including the temporary key "abc1". Consequently, the second user can see that the password has been reset by a user different from himself/herself. Further, as illustrated in FIG. 4, the message MS2 includes the email address MA1 corresponding to the first user. Consequently, the second user can identify the user who had reset the password.

In the subsequent T90, the printer 10 changes the state of the printer 10 from the permitted state to the prohibited state (S40 of FIG. 3).

In the present case, when the reset button in the top screen is selected by the first user (T20 of FIG. 2), the printer 10 sends the reset emails RM1, RM2 including the reset URL with the plurality of email addresses MA1, MA2 corresponding to the plurality of users who uses the account information as their recipients (T30, T34). Consequently, the reset URL is selected by the first user among the plurality of users who uses the account information (T40), and the new password PW2 is stored in the account table 42 (T78 of FIG. 4). In the situation in which the plurality of users uses the account information, changing of the password PW1 to the password PW2 can suitably be executed.

Case C2; FIG. 5

Referring to FIG. 5, Case C2 in which the reset command is received from a terminal device 900 of a third party will be described. For example, a malicious third party obtains an IP address of the printer 10 and operates the terminal device 900 to select the reset button in the top screen. In the initial state of the present case, no one is logged into the printer 10. T122 is the same as T22 of FIG. 2 except that the terminal device 900 is used. In T124, the printer 10 determines that a login session is not established with an external device (NO in T24 of FIG. 2). T126 to T136 are the same as T26 to T36 of FIG. 2.

In the present case, the third party guesses the temporary key in the reset emails RM1, RM2 and causes the terminal device 900 to execute sending of an execution command including the guessed temporary key multiple times. T142 is the same as T42 of FIG. 2 except that the terminal device 900 is used and the execution command includes the guessed temporary key "xyz1".

T162 is the same as T62 of FIG. 4. In T164, the printer 10 determines that the temporary key "xyz1" in the execution command of T142 is not identical to any of the temporary keys in the account table 42 (NO in S30 of FIG. 3). In T168, the printer 10 increments the count (S50). In the present case, at this point, the terminal device 900 has repeatedly sent the execution command "3" times. In T170, the printer 10 determines that the count is greater than or equal to the predetermined value "3" (YES in S52).

In T180 and T184, the printer 10 respectively sends, to the email server 300, alarm emails each of which includes corresponding one of all the email addresses, which are the email addresses MA1, MA2, in the account table 42 as their recipients (S54). Consequently, the terminal device 100 displays an alarm email AM1 in T182 and the terminal device 200 displays an alarm email AM2 in T186. With such a configuration, the first and second users can see that the third party fraudulently tried to reset the password.

In T190, the printer 10 changes the state of the printer 10 from the permitted state to the prohibited state (S40). Consequently, reset of the password by the third party can be prevented.

For example, a comparative example in which the reset URL does not include the temporary key is assumed. In this comparative example, if a pass to a program for the reset process is obtained by the third party, the password may be reset by the third party. Contrary to this, in the present case, even if the pass to the program for the reset process is obtained by the third party, the temporary key is not obtained by the third party, and reset of the password by the third party can be prevented by the determination in T164. In a variant, the configuration of the above comparative example may be employed.

Case C3; FIG. 6

Referring to FIG. 6, another case C3 in which the reset command is received from the terminal device 900 of the third party will be described. T222 to T236 are the same as T122 to T136 of FIG. 5.

In the present case, the first user of the terminal device 100 selects the cancel URL in the reset email RM1 in T240. Consequently, the terminal device 100 sends a cancel command to the printer 10 in T242. The cancel command is a command to cause the printer 10 to execute processes from T244 to be described. The cancel command includes the cancel URL in the reset email RM1. The cancel command includes the temporary key "abc1".

In T244, the printer 10 determines whether the temporary key in the cancel command is identical to any of the all the temporary keys in the account table 42. In the present case, the printer 10 determines that the temporary key "abc1" in the cancel command is identical to the temporary key "abc1" in the account table 42. In this case, the printer 10 changes the state of the printer 10 from the permitted state to the prohibited state according to the cancel URL in the cancel command in T246. Specifically, the printer 10 deletes all the temporary keys in the account table 42. If the printer 10 determines that the temporary key in the cancel command is not identical any of the all the temporary keys in the account table 42, the printer 10 skips the processes from T246 and ends the process of FIG. 6.

In the subsequent T248, the printer 10 sends cancel screen data to the terminal device 100. The cancel screen data is webpage data corresponding to a cancel screen which indicates that the reset-permitted state has been canceled. In T250, the terminal device 100 displays the cancel screen.

In the present case as well, as with FIG. 5, the third party causes the terminal device 900 to execute the sending of the execution command including the temporary key guessed by the third party. T342 is the same as T142 of FIG. 5.

In T362, the printer 10 determines that the state of the printer 10 is the prohibited state (NO in S20 of FIG. 3). In T364, the printer 10 sends the prohibition notification screen data to the terminal device 900 (S22). In T368, the terminal device 900 displays the prohibition notification screen.

With such a configuration, the first user can select the cancel URL and prevent the reset of the password by the third party.

Corresponding Relationships

The printer 10 and the memory 34 are an example of "communication device" and "memory", respectively. The email addresses MA1, MA2 are examples of "a plurality of pieces of destination information". The reset URL and the cancel URL are an example of "first information" and "second information", respectively. The temporary key in the reset URL is an example of "specific identification information". The temporary keys "abc1", "abc2" are an example of "first identification information", "second identification information", respectively. The terminal device 100 is an example of "external device". Selection of the reset button of T20 of FIG. 2 is an example of "changing request". The terminal devices 100, 200 are an example of "first destination", "second destination", respectively. The passwords PW1, PW2 are an example of "first password", "second password", respectively. The second completion email CM2, the first completion email CM1 are an example of "first completion notification", "second completion notification", respectively. The alarm emails in S54, S56 of FIG. 3 are examples of "specific notification". The login notification screen data in T28 of FIG. 2 is an example of "predetermined notification".

T30, T34 of FIG. 2 are examples of the process of "send first information". T78 of FIG. 4 is an example of the process of "store a second password".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification 1

"Communication device" is not limited to the printer 10, and may be a scanner, a facsimile, a multi-function peripheral, a PC, and the like.

Modification 2

"Memory" is not limited to the memory 34 of the printer 10, and may for example be another device (e.g., a server) separate from the printer 10.

Modification 3

"Destination information" is not limited to the email address MA1, and may for example be an ID to identify the terminal device 100 (e.g., an ID to identify an application program installed in the terminal device 100).

Modification 4

In the above-described embodiment, the reset URL includes information indicating where the program for the reset process of FIG. 3 is stored. Instead of this, the reset URL may include information indicating where the program to cause the printer 10 to create the new password is stored. In this case, instead of the password currently stored in the account table 42, the printer 10 may store the new password created by the printer 10 in the account table 42. In the present variant, the reset URL including information indicating where the program to cause the printer 10 to create the new password is stored is an example of "first information".

Modification 5

Sending of the second completion email CM2 in T84 of FIG. 4 may not be executed. In this variant, "first completion notification" may be omitted.

Modification 6

Sending of the first completion email CM1 in T80 of FIG. 4 may not be executed. In this variant, "second completion notification" may be omitted.

Modification 7

The second completion email CM2 may include the same message MS1 as the first completion email CM1 and may not include the message MS2. In the present variant, "message" may be omitted.

Modification 8

"External device" is not limited to the terminal device 100 that received the reset email RM1, but may be another terminal device different from the terminal device 100. In this case, for example, the first user may manually input the reset URL to the other terminal device.

Modification 9

The process of S30 of FIG. 3 may not be executed. In the present variant, "specific identification information" may be omitted.

Modification 10

The process of S40 after NO in S30 of FIG. 3 may not be executed. In other words, the process of FIG. 5 may not be executed. In the present variant, "prohibit the changing of the first password to the another password" may be omitted.

Modification 11

The processes of S54, S56 of FIG. 3 may not be executed. In the present variant, "send a specific notification" may be omitted.

Modification 12

The reset email may not include the cancel URL nor execute the process of FIG. 6. In the present embodiment, "second information" and "prohibit the changing of the first password to the another password" may be omitted.

Modification 13

The process of S40 after YES in S30 of FIG. 3 may not be executed. In this variant, "prohibit the changing of the first password to the another password" may be omitted.

Modification 14

The process of T26 of FIG. 2 may be executed after receipt of the execution command in T42. In other words, the timing at which "predetermined notification" is sent is not limited to T28 of FIG. 2, but may be after T42.

Modification 15

The process of T28 of FIG. 2 may not be executed. In this variant, "predetermined notification" may be omitted.

Modification 16

"First information" is not limited to the reset URL, and it may for example be a part of the reset URL (e.g., only the temporary key) or information indicating an input screen in conformity with an application program installed in the terminal device 100.

Modification 17

In the above embodiments, the processes of FIGS. 2 to 6 are implemented by a software (e.g., the programs 40), however, at least one of these processes may be implemented by hardware such as a logic circuit.

What is claimed is:

1. A communication device comprising a controller, wherein
the controller is configured to:
in a case where a changing request is inputted by a specific user of a plurality of users under a situation where a memory stores a first password used by the plurality of users in association with a plurality of pieces of destination information corresponding to the plurality of users, send first information to each of a plurality of destinations indicated by the plurality of pieces of destination information in the memory, the changing request being for changing the first password to another password, the first information being for receiving an instruction for changing the first password to the another password according to the changing request, the plurality of destinations being a plurality of terminal devices different from the communication device; and
in a case where the first information is used in a first destination among the plurality of destinations and an instruction for changing the first password to the another password according to the changing request is provided by a first user among the plurality of users after the first information has been sent to each of the plurality of destinations, store a second password being the another password in the memory instead of the first password.

2. The communication device as in claim 1, wherein
the controller is further configured to:
after the second password has been stored in the memory, send a first completion notification to a second destination among the plurality of destinations, the first completion notification indicating that the changing of the first password to the another password according to the changing request has been completed, the second destination being different from the first destination where the first information has been used.

3. The communication device as in claim 2, wherein
the controller is further configured to:
after the second password has been stored in the memory, further send a second completion notification to the first destination where the first information has been used, the second completion notification indicating that the changing of the first password to the another password according to the changing request has been completed.

4. The communication device as in claim 2, wherein
the controller is configured to:
send the first information including first identification information to the first destination, and
send the first information including second identification information being different from the first identification information to the second destination, the controller is further configured to:
in a case where the first information is used in the first destination, receive the first identification information included in the first information from a device used by the first user, and the first completion notification includes a message notifying a second user corresponding to the second destination that the instruction for changing the first password to the another password according to the changing request has been provided by the first user corresponding to the first destination that is a recipient of the first identification information received by the communication device.

5. The communication device as in claim 1, wherein

The controller is configured to send the first information including specific identification information to the first destination, and in a case where identification information that is identical to the specific identification information is received from an external device after the first information has been sent to the first destination, store the second password in the memory, and in a case where identification information that is not identical to the specific identification information is received from the external device after the first information has been sent to the first destination, the second password is not stored in the memory.

6. The communication device as in claim 5, wherein the controller is further configured to:

in a case where the identification information that is not identical to the specific identification information is received from the external device, prohibit the changing of the first password to the another password in which the first information is used.

7. The communication device as in claim 5, wherein the controller is further configured to:

in a case where the identification information that is not identical to the specific identification information is received from the external device, send a specific notification to each of the plurality of destinations indicated by the plurality of pieces of destination information in the memory, the specific notification indicating that the identification information that is not identical to the specific identification information has been received from the external device.

8. The communication device as in claim 1, wherein the controller is configured to send second information as well as the first information to each of the plurality of destinations, the second information being for receiving an instruction for not permitting the changing of the first password to the another password according to the changing request, and the controller is further configured to:
in a case where the second information is used in the first destination and the instruction for not permitting the changing of the first password to the another password according to the changing request is provided by the first user after the first information and the second information have been sent to each of the plurality of destinations, prohibit the changing of the first password to the another password in which the first information is used.

9. The communication device as in claim 1, wherein the controller is further configured to:

after the first information has been used in the first destination and the second password has been stored in the memory, prohibit the changing of the first password to the another password in which the first information is used.

10. The communication device as in claim 1, wherein the controller is further configured to:

in a case where the changing request is inputted by the specific user and a communication session using the first password has been established between the communication device and a device different from the communication device, send a predetermined notification to a terminal device corresponding to the specific user.

11. The communication device as in claim 1, wherein the first information includes a Uniform Resource Locator (URL) for causing the communication device to execute a process for changing the first password to the another password.

12. A non-transitory computer-readable recording medium storing computer-readable instructions for a communication device, wherein the computer-readable instructions, when executed by a processor of the communication device, cause the communication device to:

in a case where a changing request is inputted by a specific user of a plurality of users under a situation where a memory stores a first password used by the plurality of users in association with a plurality of pieces of destination information corresponding to the plurality of users, send first information to each of a plurality of destinations indicated by the plurality of pieces of destination information in the memory, the changing request being for changing the first password to another password, the first information being for receiving an instruction for changing the first password to the another password according to the changing request the plurality of destinations being a plurality of terminal devices different from the communication device; and in a case where the first information is used in a first destination among the plurality of destinations and an instruction for changing the first password to the another password according to the changing request is provided by a first user among the plurality of users after the first information has been sent to each of the plurality of destinations, store a second password being the another password in the memory instead of the first password.

* * * * *